United States Patent Office 3,410,834
Patented Nov. 12, 1968

3,410,834
CROSSLINKED 1,3,4-POLYOXADIAZOLES
Gerfried Pruckmayr, Wilmington, Del., assignor to E. I.
du Pont de Nemours and Company, Wilmington, Del.,
a corporation of Delaware
No Drawing. Filed Dec. 3, 1964, Ser. No. 415,792
3 Claims. (Cl. 260—78.4)

ABSTRACT OF THE DISCLOSURE

Novel crosslinked 1,3,4-polyoxadiazoles useful in bonding metals are prepared by heating low molecular weight precursors derived from aromatic di- or tri-esters and aromatic tri- or di-hydrozides, respectively.

---

This invention relates to a new class of 1,3,4-polyoxadiazoles, and more particularly to a new class of thermally-stable, high molecular weight, 1,3,4-polyoxadiazoles which are especially suitable for use as metal adhesives.

The preparation of organic compounds which are commercially useful as thermally-stable metal adhesives has been a long recognized goal of practitioners in the art. In the manufacture of supersonic aircraft, for example, conventional riveting and welding are often unacceptable for joining the outer surface metal sheeting onto the internal supporting members. Thus, it is desired to provide an organic material to adhere such components together. The requirements for such an organic compound metal adhesive are inherently demanding. The compound must provide very tenacious metal bonds in order that the adhered joints can withstand severe stresses and strains. Moreover, such bonds must be retained at the very high temperatures which are attained on the surfaces of these aircraft; therefore, the compound must possess thermal and chemical stability.

Several high molecular weight organic polymers have been prepared which possess thermal stability. However, most of these polymers do not function properly as metal adhesives. For example, 1,3,4-polyoxadiazoles having the recurring structural unit:

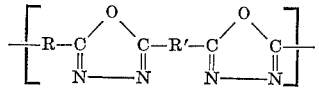

wherein R and R' are divalent organic aromatic or aliphatic radicals, are known to possess excellent thermal and chemical stability. However, as discussed further hereinafter, the 1,3,4-polyoxadiazoles prepared heretofore have been totally unacceptable for use as metal adhesives.

The 1,3,4-polyoxadiazoles of the prior art have been used primarily as self-suporting films and fibers where thermal and chemical stability are desired properties. Because of these thermal and chemical stability properties, it is extremely difficult to shape these 1,3,4-polyoxadiazoles into film, fibers and the like. Therefore, it has been common practice to first prepare a 1,3,4-polyoxadiazole precursor which can be formed into a film or fiber, as desired, and then convert the precursor into the 1,3,4-polyoxadiazole. The precursors used heretofore for such purposes are high molecular weight polyhydrazides having the recurring structural unit:

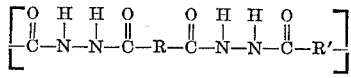

wherein R and R' are divalent organic aromatic or aliphatic radicals.

The prior art teaches various ways by which these polyhydrazides may be produced, via solution reactions. For example, such polyhydrazides are produced by heating a solvent solution of a diacyl chloride having the formula:

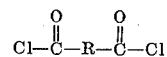

and a dihydrazide of the formula:

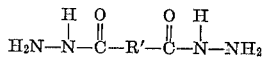

wherein R and R' are divalent organic aromatic or aliphatic radicals. Similarly, these polyhydrazides may also be prepared by heating a solvent solution of a dicarboxylic acid, acid ester, or anhydride with a dihydrazide of the formula indicated immediately above. However, the linear polyoxadiazoles obtained from the thermal conversion of these prior art linear polyhydrazides provide bond strengths to metal which are far below normal commercial specifications, and thus, are totally unacceptable as metal adhesives.

It is an object of this invention to provide an improved organic compound metal adhesive. Another object is to provide an improved 1,3,4 - polyoxadiazole. A further object is to provide an improved crosslinked, thermally stable 1,3,4-polyoxadiazole which is especially suitable for use as a metal adhesive.

These and other objects are attained by the present invention which provides a crosslinked 1,3,4-polyoxadiazole having the recurring unit:

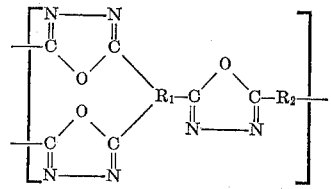

wherein $R_1$ is a trivalent aromatic carbocyclic or heterocyclic radical and $R_2$ is a divalent aromatic carbocyclic or heterocyclic radical.

The 1,3,4-polyoxadiazoles of this invention are most conveniently prepared by heating a low molecular weight, meltable polyhydrazide having the recurring unit:

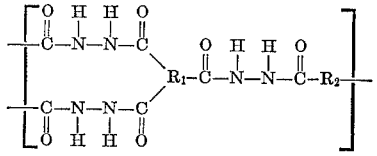

wherein $R_1$ is a trivalent aromatic carbocyclic or heterocyclic radical and $R_2$ is a divalent aromatic carbocyclic or heterocyclic radical. Heating such a polyhydrazide at a temperature of about 250° to 320° C. results in a thermal conversion to the 1,3,4-polyoxadiazoles of this invention.

These polyhydrazides in turn are prepared by heating a mixture of at least one particular aromatic or heterocyclic ester with a certain dihydrazide and/or trihydrazide to obtain a melt, and then controllably heating this molten mixture until the polyhydrazide is obtained. The class of esters used are characterized by the formulae:

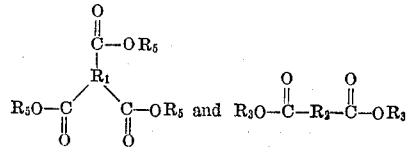

and the di- and trihydrazides are characterized by the formulae:

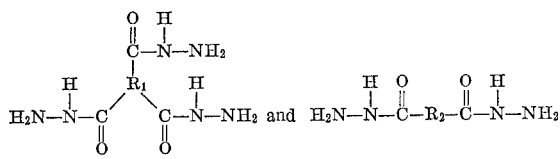

In these formulae, each $R_1$ represents a trivalent aromatic carbocyclic or heterocyclic radical such as

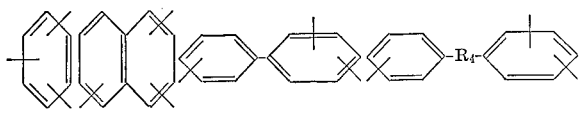

wherein $R_4$ is a divalent radical or element such as
—$CH_2$—

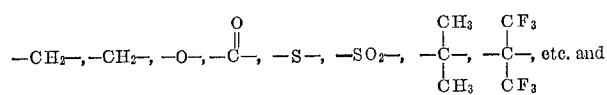 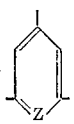

wherein Z represents nitrogen, sulfur or the like. Each $R_2$ is a divalent aromatic carbocyclic or heterocyclic radical such as phenylene, naphthylene, biphenylene, anthrylene, furylene, benzfurylene, and

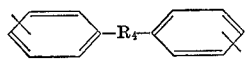

wherein $R_4$ is a divalent radical or element as described above, and the like. Each $R_5$ represents an aryl radical such as phenyl, biphenyl, napthyl, cresyl, dichlorophenyl, etc. or an alkyl radical such as methyl, ethyl, butyl, etc. Preferably, each $R_1$ and $R_2$ is an aromatic radical, and $R_3$ is phenyl.

More than one type of ester and more than one type of hydrazide may be used to produce the polyhydrazides used in the practice of this invention. However, it is critical that the reaction mixture contain either a preponderant proportion of triester and dihydrazide or a preponderant proportion of diester and trihydrazide. The preferable reaction is between the triester and dihydrazide. Although the reaction between the diester and trihydrazide theoretically gives the same product as does the reaction between the triester and diester, unexplainably it has been discovered that the former reaction often yields a product which either is not meltable or has an undesirably high melting point, and which is only difficulty soluble in most solvents. Also, it would be expected that a polyhydrazide having the formula:

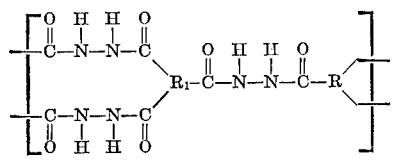

which is produced by the reaction between a triester and a trihydrazide, would have similar properties to the polyhydrazides of this invention. However, contrary to expectations, the polyhydrazide of a triester and a trihydrazide is not meltable, and is not solvent soluble, and thus, is not useful in the present invention.

The ester and hydrazide are reacted in a mole ratio of hydrazide to ester of from about 0.9:1 to about 1.5:1, or preferably from 1:1 to 1.2:1. After the starting materials have melted, the heating of the molten mixture is continued, normally at a temperature of about 200–300° C. The heating is discontinued before the inherent viscosity of the resulting polyhydrazide exceeds 0.2, measured as a 0.5% solution in any suitable solvent at 30° C., according to the procedure specified in ASTM D–1601. Preferably, the heating is discontinued when the inherent viscosity of the polyhydrazide reaches 0.04 to 0.12, since the 1,3,4-polyoxadiazoles giving the highest bond strengths are derived from polyhydrazides having inherent viscosities of from 0.04 to 0.12 which provide better substrate surface wetting. The cooled product is obtained in the form of a solid material which may be subsequently used as a finely-divided powder.

These polyhydrazides are meltable. That is, they have definite, although not necessarily sharp, melting points. Usually the melting points are from about 50° to about 200° C. Maximum utility and highest ultimate bond strengths are obtained from polyhydrazides having melting points of 100 to 150° C. Of particular importance is the fact that these polyhydrazides remain stable for considerable lengths of time in the molten state without degradation.

These polyhydrazides may be converted into crosslinked 1,3,4-polyoxadiazoles of this invention having the recurring unit:

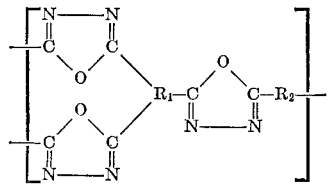

wherein $R_1$ represents a trivalent aromatic carbocyclic or heterocyclic radical, and $R_2$ represents a divalent aromatic carbocyclic or heterocyclic radical, by subjecting the polyhydrazides to elevated temperatures, on the order of 250° to 320° C. These crosslinked 1,3,4-polyoxadiazoles are high molecular weight, thermally and chemically stable polymers which form very tenacious bonds with various metals.

Instead of preparing the 1,3,4-polyoxadiazoles of this invention by the thermal conversion of polyhydrazides as described, alternately, these 1,3,4-polyoxadiazoles may be prepared directly from the melt reaction of the ester and hydrazide, as used to prepare the polyhydrazide precursors, except that the reaction is not stopped to isolate the polyhydrazide, but is carried through until the 1,3,4-polyoxadiazole is obtained. However, since there are no known solvents for these 1,3,4-polyoxadiazoles, and mere powdered mixtures of the ester and hydrazide starting materials are impractical to convert directly into adhesive bonds, coatings, sheets, and the like; it is usually far more convenient to first prepare a polyhydrazide, which may be applied or shaped in the uses described below, and then convert it into the 1,3,4-polyoxadiazole.

The 1,3,4-polyoxadiazoles of this invention are high molecular weight, thermally stable crosslinked polymers. The chemical stability of these polymers is demonstrated by the fact that no solvents have been discovered which dissolve these polymers. The 1,3,4-polyoxadiazoles of this invention are insoluble in the normal solvents used to dissolve high molecular weight polymers. For example, these 1,3,4-polyoxadiazoles are insoluble in dimethylformamide, dimethylacetamide, dimethylsulfoxide, N-methylpyrrolidone, hexamethylphosphoramide, and concentrated sulfuric acid.

As indicated above, the 1,3,4-polyoxadiazoles of the prior art having the recurring unit:

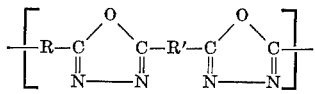

wherein R and R' represent divalent aromatic or aliphatic radicals are not useful in metal adhesive applications. However, the 1,3,4-polyoxadiazoles of this invention are especially useful as metal adhesives. These polyhydrazides lead to tenacious bonds on a wide variety of metals such as copper, brass, aluminum, titanium, molybdenum, and steel, including the various stainless steels which are normally considered to be very difficult to bond together with organic adhesives. In the use of the 1,3,4-polyoxadiazoles of this invention as adhesives, it is preferred to start with a polyhydrazide as described above. These polyhydrazides may be used alone or in admixture with metal particle fillers, such as aluminum or zinc dust, and the like. Where the surfaces to be adhered together are in a horizontal plane, the polyhydrazides may be used as finely-divided powder, by sprinkling the powder onto one of the surfaces, and bringing the second surface into contact therewith. Then, the laminate is subjected to heat treatment to first melt the polyhydrazide which melts and flows to completely fill the joint between the two surfaces, and thereafter to convert the polyhydrazide into the 1,3,4-polyoxadiazole. Alternately, these polyhydrazides may be first melted and then used in accordance with familiar hot melt techniques. Also, if desired, these polyhydrazides may be dissolved in a suitable solvent to prepare a solution or may be blended with a sufficient amount of solvent to form a paste or dough which may be conveniently applied to the surfaces to be adhered. Suitable solvents for these polyhydrazides include dimethylformamide, dimethylacetamide, N - methylpyrrolidone, dimethylsulfoxide, hexamethylphosphoramide, and the like. An adhesive tape may be prepared by impregnating a glass fiber cloth, or the like, with a paste of the polyhydrazide, and thereafter removing the solvent by air-drying. This tape then may be used as a heat-sensitive adhesive. After the polyhydrazides have been applied to the metal surfaces, and converted to the 1,3,4-polyoxidiazole, very strong bonds are formed which possess remarkable thermal and chemical resistance.

The 1,3,4-polyoxadiazoles of this invention are useful as shaped articles of manufacture, such as, filaments, films, tubes, rods, and the like. In the practice of this aspect of the present invention, the polyhydrazides described above are shaped into the desired article of manufacture, and then thermally converted into the 1,3,4-polyoxadiazole. If desired, inert materials may be added before or after shaping. Such fillers include pigments, electrically conductive carbon black, metal particles, abrasives, dielectrics, and lubricating polymers. Cellular products, such as foams, may be produced by the use of conventional blowing agents, or by dispersing bubbles of a suitable gas, such as air, carbon dioxide, nitrogen, etc. into a melt or solution of these polyhydrazides.

The 1,3,4-polyoxadiazoles of this invention are also useful as coating compositions. Such compositions may be prepared from hot melts or solutions of the polyhydrazides in a suitable solvent. The usual techniques of application such as brushing, spraying, rolling, dipping, doctoring, and the like, may be used to apply such polyhydrazide coating compositions onto a wide variety of substrates including steel, aluminum, copper, brass, and other metals in the form of sheets, fibers, wires, screening; mineral structures such as asbestos; glass in the form of sheets, fibers, foams, fabrics, and the like; polymeric materials such as cellulosics, polyolefins, polyesters, polyamides, polyimides, polyfluorocarbons, polyurethanes, in the form of sheets, fibers, fabrics, screening, etc.; leather sheets and the like. After the polyhydrazide is applied onto the substrate as desired, it is thermally converted into the 1,3,4-polyoxadiazole.

The invention is further illustrated by the following examples:

EXAMPLE 1

This example shows the preparation of one of the preferred polyhydrazides which are precursors for the 1,3,4-polyoxadiazoles of this inventon. A dry powdered mixture of 2.92 grams of triphenyltrimesate and 1.94 grams of isophthallyldihydrazide was mixed thoroughly in a mortar, and then charged to a small resin kettle. The resin kettle was immersed into an oil bath which was preheated to 260° C. The powdered mixture melted, and the molten mixture was stirred to prevent separation into two layers. A slow stream of nitrogen was passed through the resin kettle during the entire reaction time. Phenol was evolved during this heating cycle. The two layers gradually became miscible, and the melt viscosity increased. After 10 minutes, the resin kettle was removed from the oil bath and cooled to room temperature. The resulting molten polyhydrazide solidified, and then was ground to a white powder. The softening point of this polyhydrazide was 160–170° C. The inherent viscosity was 0.08, as measured at 30° C. in a 0.5% dimethyl acetamide solution. On further heating this polyhdrazide polymerizes and starts to lose weight at 230° C., as shown by thermogravimetric analysis. The final cross-linked 1,3,4-polyoxadiazole was found to be stable at temperatures up to about 400° C. Thermogravimetric analysis is an inert atmosphere of helium and at a heating rate of 9° C. per minute showed a weight loss of only 0.5% at 400° C., 2% at 425° C., 3.5% at 450° C., 8% at 475° C., and 18% at 500° C.

EXAMPLE 2

This example illustrates the use of the 1,3,4-polyoxadiazoles of this invention as metal adhesives. Strips of stainless steel, 1 inch x 3 inches, were prepared by the procedure described as Method I by Guttman, Concise Guide to Structural Adhesives, Reinhold Publishing Corp., New York (1961), p. 21. The powdered product of Example 1 was applied to about a ½ inch segment of the end of the strip. Another strip was brought into contact therewith to provide a 0.5 inch overlap. This assembly was heated to about 300° C. for two hours under a constant pressure of 200 p.s.i. which converted the polyhydrazide into the corresponding 1,3,4-polyoxadiazole. The shear strength of the bond was 3,200 p.s.i. at room temperature and 2,300 p.s.i. at 300° C., as determined by the test procedure described in ASTM D–1002.

EXAMPLE 3

A dry powdered mixture of 4.38 grams of triphenyltrimesate and 2.29 grams of the dihydrazide of p,p'-diphenyloxide dicarboxylic acid was prepared and reacted in a resin kettle as shown in Example 1. The oil bath temperature was maintained at 250° C. After 5 minutes, the resin kettle was removed from the oil bath and cooled to room temperature. The resulting molten polyhydrazide solidified, and then was ground to a white powder. The softening point of this polyhydrazide was 160° C., and the inherent viscosity was 0.09, measured as described in Example 1. The lap shear strength of the corresponding 1,3,4-polyoxadiazole at room temperature was 2,200 p.s.i., determined as shown in Example 2.

EXAMPLE 4

A dry powdered mixture of 4.38 grams of triphenyltrimesate, 3.18 grams of diphenylisophthalate, and 6.85 grams of isophthalyl dihydrazide was prepared, reacted and the resulting polyhydrazide ground to a powder as shown in Example 1. The softening point of this polyhydrazide was 100° C., and the inherent viscosity was 0.04, measured as described in Example 1. The lap shear strength of the 1,3,4-polyoxadiazole at room temperature was 1500 p.s.i., determined as shown in Example 2.

EXAMPLE 5

This example shows the preparation of a linear 1,3,4-polyoxadiazole of the prior art. A dry powdered mixture of 1.59 grams of diphenylisophthalate and 0.97 gram of isophthaloyldihydrazide was prepared and reacted in a resin kettle as described in Example 1. After 8 minutes, the resin kettle was removed from the oil bath. The resulting molten polyhydrazide was cooled to room temperature and ground to a white powder. The softening point of this polyhydrazide was 140° C., and the inherent viscosity was 0.06, measured as shown in Example 1. The lap shear strength of the 1,3,4-polyoxadiazole at room temperature was only 400 p.s.i., determined as shown in Example 2, thus clearly illustrating the unexpected superiority of the 1,3,4-polyoxadiazoles of this invention.

I claim:

1. A crosslinked 1,3,4-polyoxadiazole consisting essentially of recurring units of the general formula:

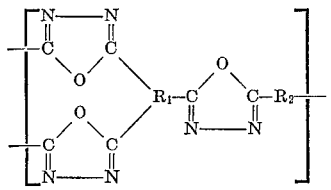

wherein $R_1$ is a trivalent aromatic radical and $R_2$ is a divalent aromatic radical.

2. A crosslinked 1,3,4-polyoxadiazole consisting essentially of recurring units of the general formula:

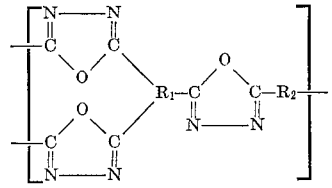

wherein $R_1$ is a trivalent aromatic carbocyclic radical and $R_2$ is a divalent aromatic carbocyclic radial.

3. A crosslinked 1,3,4-polyoxadiazole consisting essentially of recurring units of the general formula:

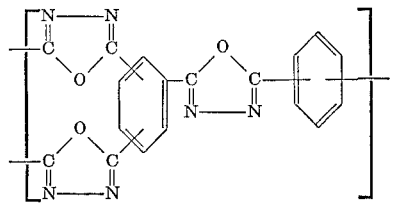

References Cited

UNITED STATES PATENTS

| | | | |
|---|---|---|---|
| 2,615,862 | 10/1952 | McFarlane et al. | 260—78 |
| 3,044,994 | 7/1962 | Blomstrom | 260—78 |
| 3,130,182 | 4/1964 | Frazer | 260—78 |
| 3,130,183 | 4/1964 | Frazer | 260—78 |

WILLIAM H. SHORT, *Primary Examiner.*

H. D. ANDERSON, *Assistant Examiner.*